Aug. 21, 1945.    P. S. MORGAN    2,383,408
POSTAL SCALE
Filed Aug. 25, 1943
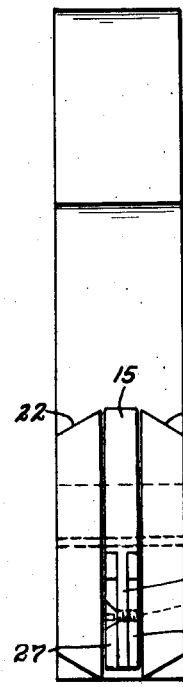
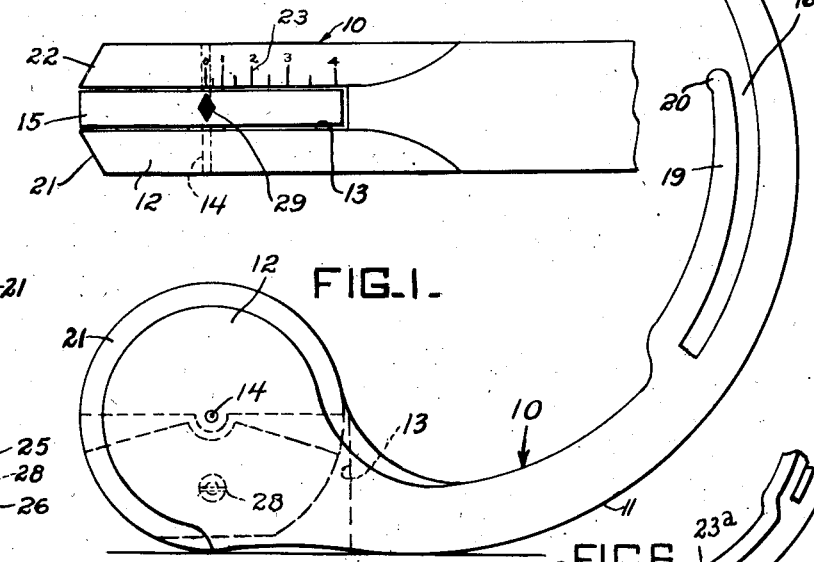
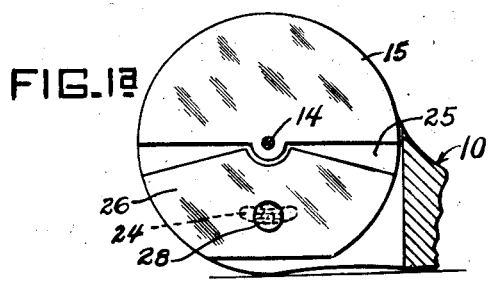
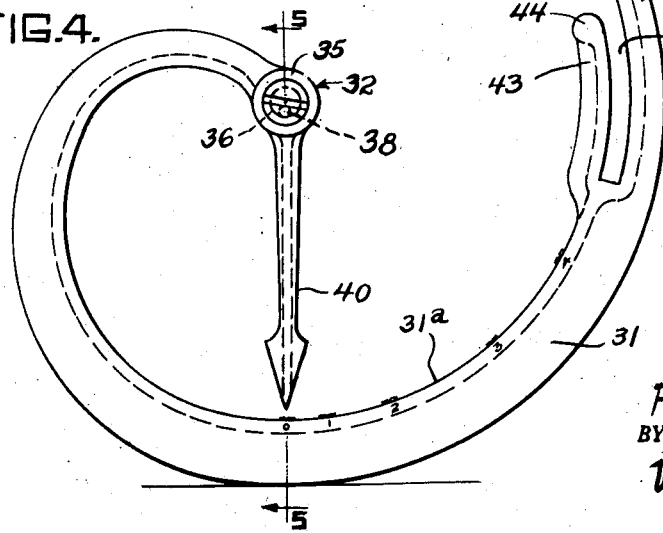
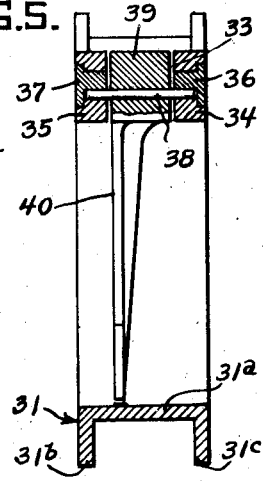
INVENTOR.
PORTER S. MORGAN
BY
Van Deventer + Grier
ATTORNEYS.

Patented Aug. 21, 1945

2,383,408

UNITED STATES PATENT OFFICE 2,383,408

POSTAL SCALE

Porter S. Morgan, Westport, Conn.

Application August 25, 1943, Serial No. 499,875

10 Claims. (Cl. 265—49)

This invention relates to improvements in postal scales, and has for an object the provision of a curved body member having a slot extending therein from one end thereof, a counterbalancing weight pivotally carried adjacent to the other end thereof, and graduations formed on said body, said body member being adapted to rock on a plane surface in accordance with the weight of piece of mail placed in said slot, and the graduation vertical to the point of tangency between said body and said surface indicates the amount of postage required.

Another object of the invention is the provision in a postal scale, of a body in the form of a rocker, and open ended arcuate slot formed in one end of said body for receiving and retaining a piece of mail, a pivoted weight carried on other end of said body, a graduated scale on said body, and indicating means being always urged by gravity to a position predetermined with respect to the vertical.

The further object of the invention is the provision in a postal scale, of a curved body member, a mirror upon which said member may rock, an open ended arcuate slot formed in one end of said body for receiving and retaining a piece of mail, a pivoted weight adjustably mounted in other end of said body to enable the scale to be calibrated after assembly, and a series of graduations extending from the periphery of said body along at least one lateral face thereof, said mirror being adapted to reflect images of said graduations angular with respect to the original graduations, on each side of the point of tangency of said mirror and said body, and adapted to reflect the image of any graduation at the point of tangency in alignment with the graduation itself.

Other objects will be apparent to those skilled in the art upon a study of the following specification, the drawing and the appended claims.

Referring to the drawing:

Figure 1 is a side elevation of one side of a postal scale given by way of example, as embodiment of the invention;

Fig. 1a is a fragmentary view of the hub shown in Figure 1, with a portion broken away to show the mounting of the weights on the indicator member;

Figure 2 is an end elevation of the postal scale shown in Figure 1;

Figure 3 is a plan view of the postal scale shown in Figure 1;

Figure 4 is a side elevation of a modification of the embodiment shown in Figure 1;

Figure 5 is a sectional elevation as seen on the line 5—5 of Figure 4; and

Figure 6 is a fragmentary view of a portion of the scale of Figure 1, positioned on a mirrored surface showing the graduation at the point of tangency between the scale and the mirror in alignment with its image in the mirror, and showing graduations on either side thereof angular with respect to their images in the mirror.

Referring first to Figures 1, 2, and 3, a curvilinear body, generally designated by the numeral 10 has a lower surface 11 in the form of a rocker. The left end of the body 10 as seen in Figure 1 is in the form of a hub 12, and a vertical slot 13 is formed therein midway between the two sides of the hub. A shaft 14 extends through the center of the hub and has journalled thereon an indicator member 15 which will presently be described in detail. The right end of the body 10 as seen in Figure 1 has a curved slot 16 formed therein, and the portions of the body bounding this slot are in the form of a leg 17, the end 18 of which is preferably rounded, and a shorter leg 19 preferably having a rounded end 20.

When a piece of mail is inserted in the slot 16 the curved legs 17 and 19 serve to hold the mail in a curved state and thereby the piece of mail is firmly and yet removably held in the slot.

The circumferential edges of the hub 12 are bevelled as shown at 21 and 22, and either one or both of these bevelled surfaces may carry graduations such as those shown at 23.

The body 10 may be made of any desired material. However, it is believed preferable to mold the body in one piece, of plastics, or the like.

Referring now to Figure 1a, the indicator member 15 is shown in the form of a disc having its lower portion cut away on each side to form a somewhat semi-circular tongue 25 having an arcuate slot 24 formed therein. A pair of weights 26 and 27 are secured together by means of a screw 28 passing through the slot 24. This screw is preferably a flat headed screw, the head of which rests in the countersunk pole in the weight 27. The shank of the screw passes through the slot 24 and threadedly engages the weight 26.

On the periphery of the indicator member 15 is carried a pointer 29 which, although it may be of any desired shape, is in the form of a diamond. This pointer cooperates with the scale 23, and when the device is being assembled, the weights 26 and 27 may be adjusted to bring the pointer 29 in alignment with the zero point of the scale 23.

When a piece of mail is placed in the slot 16 its weight causes the device to smoothly rock on its surface 11 when the device is placed on a plane smooth surface, such as the top of a table, desk, et cetera, and the rock is proportionate to the weight of the piece of mail.

Since the indicator member 15 is journalled on the shaft 14 and is held in a definite position by gravity, the rocking of the body causes the scale 23 to move past the pointer 29 a distance proportionate to the weight of the piece of mail.

I have found that when graduations are placed on at least one lateral side of the body 10ª (illustrated in Figure 6) said graduations extending upwardly from the rocker surface 11ª, the device may be placed on a mirror 30, the graduation 23ª at the point of tangency between the surface 11ª and the surface of the mirror is substantially in alignment with its image 23ᵇ in the mirror. Graduations to the right of the point 23ª appear to be angular with respect to their images and the apexes of the angles formed by the graduations and their images point toward the right. Graduations to the left of the point of tangency 23ª are also angular with respect to each other, and the apexes formed by the graduations and their images point to the left.

Referring now to Figures 4 and 5, a further modification is shown wherein a curved body 31 is in the form of a channel having an upper web 31ª and two vertical webs 31ᵇ, 31ᶜ joined to each end thereof and forming an inverted U. One end of the body 31 terminates in a hub 32 which has a slot 33 formed therein, leaving a boss 34 on one side thereof and a boss 35 on the other side thereof.

A shouldered bushing 36 is positioned in a stepped hole in the boss 34 and a similar bushing is aligned therewith in the boss 35. The bushings 36 and 37 each have an eccentric axial hole formed therein, and mounted in these holes is a shaft 38.

Journalled on the shaft 38 is a hub 39 having a depending indicator arm 40 preferably formed integral therewith. The bushings 36 and 37 may be turned in order to calibrate the indicator 40 in respect to the scale on the upper surface of the web 31ª.

The right end of the body 31 is bifurcated and has a long curved leg 41, the upper end 42 of which may be rounded, and a short curved leg 43, the upper end 44 of which may also be rounded. Between the legs 41 and 43 is formed a slot 45 which is adapted to receive and retain a piece of mail.

Although I have herein shown and described a postal scale employing the principle of a smooth rocker edge adapted to rock on a plane surface and I have also shown a modification thereof, it will be understood that these showings are given by way of example only and that they are not limitative, as many changes may be made in the arrangements shown and described without departing from the spirit of the invention as defined in the following claims.

What is claimed is:

1. In a postal scale, a curvilinear body having a counterbalancing weight adjacent to one end thereof and having its other end bifurcated to form a curved slot for receiving and retaining a piece of mail, the lower surface of said body forming a smooth curve adapted to rock on a plane surface in accordance with the weight of a piece of mail positioned in said slot, and indicator means on said body for indicating said weight.

2. In a postal scale, a curvilinear body having a hollow hub at one end thereof and having the other end bifurcated to form a slot bounded on each side by curved legs and adapted to receive and retain a piece of mail, the lower surface of said body being in the form of a continuous curve adapted to rock on a plane surface upon which said scale is placed, and combined counterbalancing and indicating means carried in said hub.

3. In a postal scale, a curvilinear body having a hollow hub at one end thereof and having the other end bifurcated to form a slot bounded on each side by curved legs and adapted to receive and retain a piece of mail, the lower surface of said body being in the form of a continuous curve adapted to rock on a plane surface upon which said scale is placed, means forming a vertical slot in said hub and dividing the same into two spaced bosses, a shaft mounted in said bosses, indicator means carried on said shaft, and weight means connected to said indicator means for counterbalancing said scale.

4. In a postal scale, a curvilinear body having a hollow hub at one end thereof and having the other end bifurcated to form a slot bounded on each side by a curved leg and adapted to receive and retain a piece of mail, the lower surface of said body being in the form of a continuous curve adapted to rock on any plane surface upon which said scale is placed, means forming a vertical slot through said hub dividing the same into two spaced bosses, a shaft mounted in said bosses and spanning the space therebetween, a disc journaled on said shaft between said bosses, counterbalancing means mounted on said disc, a pointing indicator formed on the periphery of said disc, and a graduations formed on the periphery of at least one of said bosses in cooperative relation with said pointing indicator.

5. In a postal scale, a curvilinear body having a hollow hub at one end thereof and having the other end bifurcated to form a slot bounded on each side by a curved legs and adapted to receive and retain a piece of mail, the lower surface of said body being in the form of a continuous curve adapted to rock on any plane surface upon which said scale is placed, a vertical slot formed in said hub dividing the same into two spaced bosses, at least a portion of the peripheral surfaces of each of said bosses being beveled, a shaft mounted in said bosses and spanning the space therebetween, a disc journaled on said shaft and positioned between said bosses, weight means set into said disc for maintaining the latter in a predetermined position under the urge of gravity, an indicator on the periphery of said disc, and graduations formed on the beveled surface of at least one of said bosses in cooperative relation with said indicator.

6. In a postal scale in combination a curvilinear body having a counterbalancing weight adjacent to one end thereof and having an arcuate slot formed in its other end for receiving and retaining a piece of mail, the lower surface of said body forming a smooth curve, a series of graduations formed on at least one lateral side of said body, and a mirror upon which said body is positioned whereby the piece of mail positioned in the slot causes said body to rock in accordance with its weight, said graduations being reflected by said mirror, and the graduation at the point of tangency between said body and said mirror appearing to be in alignment with its image in the mirror and graduations on either side thereof appearing angular with respect to their images in the mirror, the graduations to the right of said point of tangency having their apexes pointing to the right, and graduations to the left of said point of tangency having their apexes pointing toward the left.

7. In a postal scale, a curvilinear body having one end bifurcated to form a slot bounded on each side by a curved leg and adapted to receive and retain a piece of mail, the lower surface of said body being in the form of a rocker, the other end of said body having a pair of spaced bosses formed thereon, axial holes formed in said bosses, eccentric bushings mounted in said holes a shaft carried in said bushings, a counterbalanced indicator arm journaled on said shaft between said bosess, and graduations formed on the upper surface of said body and adapted to be traversed by said indicator arm.

8. In a postal scale, a body in the general form of a rocker the lower end of which is in the form of a continuous curve, said body being adapted to assume a normal position when placed on a plane surface, and curvilinear slot means on one end of said body for receiving and retaining a piece of mail in a flexed state, said body being adapted to rock smoothly from its normal position a distance proportionate to weight of said piece of mail, and indicating means on said body for indicating the required postage.

9. In a postal scale, a channelled body in the general form of a rocker, downwardly depending legs of the channel forming spaced rockers, said body being adapted to assume a normal position when placed on a plane surface, and a curved slot formed in one end of said body and constituting retaining means for receiving and retaining a piece of mail, said body being adapted to rock away from its normal position in accordance with the weight of said piece of mail, and indicating means controlled by gravity for indicating the postage required for at least several of the positions to which said body rocks.

10. In a postal scale, a body in the form of a rocker, said body being generally of an inverted "U"-shaped channelled cross section the downwardly depending legs of which form spaced rockers and the cross web of which carries a series of indications, a movable indicator arm mounted on one end of said body and maintained in a depending position by gravity, said arm having its lower end in cooperative relation with said indications, and a curved slot formed in other end of said body for receiving and retaining a piece of mail.

PORTER S. MORGAN.